United States Patent Office 3,459,676
Patented Aug. 5, 1969

3,459,676
SYNTHETIC ZEOLITE AND METHOD FOR
PREPARING THE SAME
George T. Kerr, Trenton, N.J., assignor to Mobil Oil
Corporation, a corporation of New York
No Drawing. Filed June 14, 1966, Ser. No. 557,378
Int. Cl. C01b *33/24;* B01j *11/40*
U.S. Cl. 252—430                    11 Claims

ABSTRACT OF THE DISCLOSURE

As a new zeolite, ZK–20, characterized by the formula, in terms of oxide mol ratios, as follows: 0.1 to 0.2 $R_2O$:0.8 to 0.9 $Na_2O$:1.0 $Al_2O_3$:4 to 5 $SiO_2 \cdot YH_2O$ where R is selected from the group consisting of a nitrogen-containing cation derived from 1-methyl-1-azonia-4-azabicyclo [2.2.2] octane; and Y is any value from 1 to 5.

---

This invention relates to a new synthetic zeolite and to methods for preparing it. More particularly, this invention relates to novel crystalline aluminosilicates having a crystal structure similar to that of naturally-occurring levynite and to methods for preparing such aluminosilicates.

Zeolites are naturally occurring hydrated crystalline metal aluminosilicates. Such aluminosilicates basically consist structurally of an open three dimensional framework of $SiO_4$ and $AlO_4$ tetrahedra that are cross linked by the sharing of oxygen atoms, so that the ratio of oxygen atoms to the total of the aluminum and silicon atoms is equal to two. The negative electrovalence of tetrahedra containing aluminum is balanced by the inclusion within the crystal of cations, such as alkali or alkaline earth metal ions.

Certain zeolitic materials are ordered, porous crystalline aluminosilicates having a definite crystalline structure within which there are a large number of small cavities which are interconnected by a number of still smaller channels. These cavities and channels are precisely uniform in size. Since the dimensions of these pores are such as to accept for adsorption molecules of certain dimensions while rejecting those of larger dimensions these materials have come to be known as "molecular sieves" and are utilized in a variety of ways to take advantage of these properties.

A number of synthetic crystalline zeolites have previously prepared. They are distinguishable from each other and from naturally occurring zeolites on the basis of composition, crystal structure and adsorption properties. The existence of a number of zeolites having similar but distinguishable properties advantageously permits the selection of a particular member having optimum properties for a particular use.

Such synthetic crystalline aluminosilicate are ordinarily prepared initially in the sodium form of the crystal, the process of preparation involving heating, in aqueous solution, an appropriate mixture of oxides, or of materials whose chemical composition can be completely represented as a mixture of oxides $Na_2O$, $Al_2O_3$, $SiO_2$ and $H_2O$ at a temperature of approximately 100° C. for periods of 15 minutes to 90 hours or more. The product which crystallizes within this hot mixture is separated therefrom and water washed until the water in equilibrium with the aluminosilicate has a pH in the range of 9 to 12. The aluminosilicate may then be activated by heating until dehydration is attained.

A description of such aluminosilicates, methods for their preparation and examples of their uses are found in U.S. Patents 2,971,824 and 3,033,778, whose disclosures are hereby incorporated herein by reference.

By means of prior art techniques, a great variety of crystalline aluminosilicates have been synthesized. Exemplary crystalline aluminosilicates that have been so formed are zeolite B, described in U.S. 3,008,903; zeolite K–G, described in U.S. 3,056,654; zeolite R, described in U.S. 3,030,818; zeolite T, described in U.S. 2,950,952; zeolite W, described in U.S. 3,012,853; etc.

The present invention relates to a new kind of synthetic crystalline aluminosilicate, hereinafter referred to as "zeolite ZK–20." The crystalline $(Si+Al)O_2$ framework of this novel zeolite, zeolite ZK–20, is isostructural with the naturally-occurring zeolite levynite; however, the nitrogenous cation content of zeolite ZK–20 makes this zeolite a novel composition of matter. This novel zeolite is conveniently prepared, and may be utilized as an adsorbent. For example, zeolite ZK–20 adsorbs the small molecules such as $O_2$, $H_2$, and Ne. In addition, it also is capable of adsorbing methane and ethane although the adsorption of these materials takes place very slowly. Also, included within the purview of this invention are the novel methods for the preparation of zeolite ZK–20.

The composition of zeolite ZK–20 can stoichiometrically be expressed in terms of the oxide molar ratios of its components as follows: 0.1 to 0.2 $R_2O$:0.8 to 0.9 $Na_2O$:1.0 $Al_2O_3$:4 to 5 $SiO_2 \cdot YH_2O$ where R is selected from the group consisting of a nitrogen-containing cation derived from 1-methyl-1-azonia-4-azabicyclo [2.2.2.] octane; and Y is any value from 1 to 5. Minor variations in the mole ratios of these oxides within the range indicated by the above formula do not significantly change the crystal structure or physical properties of the zeolite produced.

As previously noted, zeolite ZK–20 is isostructural with the naturally-occurring zeolite levynite. The X-ray powder diffraction pattern defining the structure of this novel aluminosilicate is set forth in the following table:

TABLE I

| dA. | I | dA. | I |
|---|---|---|---|
| 14.2 | VW | 2.41 | M |
| 10.4 | M | 2.23 | W-M |
| 9.5 | W | 2.18 | VW |
| 8.2 | S | 2.14 | M |
| 7.7 | W | 2.07 | VW |
| 6.7 | M | 2.04 | W |
| 5.2 | S | 1.96 | W |
| 4.3 | S | 1.93 | W |
| 4.1 | VS | 1.90 | W |
| 3.86 | M-S | 1.88 | VW |
| 3.62 | W | 1.86 | W |
| 3.48 | W | 1.80 | M |
| 3.34 | W | 1.69 | W |
| 3.18 | S | 1.68 | M |
| 3.10 | M | 1.60 | M |
| 2.87 | M | 1.555 | M |
| 2.81 | S-VS | 1.545 | M |
| 2.64 | M | 1.435 | M |
| 2.59 | VW | 1.400 | M |
| 2.52 | W | | |

The nitrogen-containing cation is introduced upon crystallization of zeolite ZK–20 from a reaction mixture containing 1-methyl-1-azonia-4-azabicyclo [2.2.2] octane ion, a monovalent cation whose structural formula may be represented as follows:

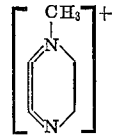

Upon thermal activation of the product, i.e. by heating in an inert atmosphere at a temperature in the approximate range of 200 to 600° C., the nitrogen-containing cation undergoes degradation to hydrogen ion.

It is a particular embodiment of the present invention that zeolite ZK-20 is prepared from reaction mixtures containing 1-methyl-1-azonia-4-azabicyclo [2.2.2] octane ion and, more specifically, by heating in an aqueous solution a mixture of the oxides of materials whose chemical compositions can be completely represented as mixtures of the oxides of Na₂O, Al₂O₃, [CH₃(CH₂CH₂)₃N₂]₂O, SiO₂ and H₂O suitably at a temperature of about 100° C. for periods of time ranging from about 2 hours to 250 hours or longer. The composition of the reaction mixture, expressed in terms of mole ratios of oxides, preferably falls within the following ranges:

$$\mathrm{SiO_2/Al_2O_3}$$

of from about 4 to about 11

$$\frac{\mathrm{Na_2O}}{\mathrm{Na_2O + [C_7H_{15}N_2]_2O}}$$

of from about 0.05 to about 0.15

$$\frac{\mathrm{H_2O}}{\mathrm{Na_2O + [C_7H_{15}N_2]_2O}}$$

of from about 20 to about 50

$$\frac{\mathrm{Na_2O + [C_7H_{15}N_2]_2O}}{\mathrm{SiO_2}}$$

of from about 0.5 to about 1.5

The product which crystallizes from the hot reaction mixture is separated, suitably by centrifuging or filtration, washed with water until the effluent wash water in equilibrium with the zeolite has a pH of from about 8 to about 12. The material, so obtained, is thereafter activated by heating in an inert atmosphere and preferably air or an oxygen-containing gas at a temperature in the approximate range of 200 to 600° C.

In making zeolite ZK-20, the usual method comprises reacting, in aqueous media, sodium aluminate with 1-methyl-1-azonia-4-azabicyclo [2.2.2] octane silicate. The reaction is carried out in a suitable vessel made, for example, of metal or glass and capable of closure to prevent loss of water. The reaction mixture is initially continuously or periodically stirred to insure homogeneity. After this mixing, agitation may be stopped as it is unnecessary to agitate the reaction mass during the formation and crystallization of the zeolite, although mixing during such latter stages has not been found to be detrimental.

The crystallization procedures can be satisfactorily carried out at temperature within the range of from about 80° C. to about 120°, the pressure being atmospheric or at least that corresponding to the vapor pressure of water in equilibrium with the mixture of reactants. While temperatures as low as about 70° C. may be employed, such lower temperatures require a long reaction period. Preferably, a temperature of about 90° to 100° C. is employed. Heating is continued until the desired crystalline zeolite product is formed. The zeolite crystals are then separated from the mother liquor and washed, preferably with distilled water, until the effluent wash water in equilibrium with the product has a pH of between about 8 and about 11.

For satisfactory use as an adsorbent, zeolite ZK-20 should be activated by at least partial dehydration. Such activation can be effected, for example, by heating the zeolite to temperatures within the approximate range of 200 to 600° C. in an inert atmosphere, preferably air under atmospheric or reduced pressure, or by maintaining the zeolite at room temperature under vacuum.

In the synthesis of zeolite ZK-20, it has been found that the composition of the reaction mixture is critical. Specifically, the presence in such mixture of 1-methyl-1-azonia-4-azabicyclo [2.2.2] octane ions has been found to be essential for the production of zeolite ZK-20. In the absence of such ions, no zeolite ZK-20 was obtained.

The crystallization temperature and the length of time the crystallization temperature is maintained are important variables in determining the yield of crystalline material. Under some conditions, for example, too low a temperature for too short a time, no crystalline product is realized. Extreme conditions may also result in formation of materials other than zeolite ZK-20. The addition of seeds of previously formed crystals of zeolite ZK-20 to the reaction mixture has been found to enhance the rate of crystallization.

The resulting crystalline synthetic aluminosilicate is one having the negative electrovalence of the aluminosilicate balanced by a cation consisting essentially of a metal such as sodium and a nitrogen-containing cation derived from 1-methyl-1-azonia-4-azabicyclo [2.2.2] octane ion, which zeolite is further characterized by a uniform effective pore diameter of about 4 angstroms.

Sodium oxide present in the reaction mixture is derived from sodium aluminate. The 1-methyl-1-azonia-4-azabicyclo [2.2.2] octane silicate solution employed is suitably prepared by dissolving silica gel in a solution of 1-methyl-1-azonia-4-azabicyclo [2.2.2] octane hydroxide. In place of silica gel, other sources of silica may be employed, for example, hydrosols of silica, silicate esters, silica aerogels, and freshly prepared, low molecular weight silicic acids. The above hydroxide may be prepared in any suitable manner.

Zeolite ZK-20 may be used as an adsorbent in any suitable form. For example, a column of powdered crystalline material may afford excellent results as may a pelleted form, obtained by pressing into pellets a mixture of zeolite ZK-20 and a suitable bonding agent, such as clay. Also, zeolite ZK-20 may be contained in a matrix of inorganic oxide gel resulting, for example, from intimate admixture of the zeolite, in finely divided form, with an inorganic oxide hydrogel or dispersion in an inorganic oxide hydrosol, followed by gelation of the resulting hydorsol. The composite so prepared may be formed into particles of desired size and shape by well known techniques: for example, spheroidal particles of gel having contained therein and distributed throughout the finely divided zeolite. The inorganic oxide gel may be silica, alumina, magnesia, zirconia, titania and the like or combinations of two or more of such oxides.

The adsorbents contemplated herein include not only the sodium form of zeolite ZK-20, as synthesized above, with sodium as the exchangeable cation but also crystalline materials obtained from such a zeolite by partial or complete replacement of the sodium ion with other cations. The sodium cations can be replaced, at least in part, by other ions including monovalent or divalent cations, such as lithium and magnesium; metal ions in Group I of the Periodic Table such as potassium and silver; Group II metal ions such as calcium and strontium; metal ions of the transition metals such as nickel, the rare earth metals such as cerium, lanthanum, praseodymium, neodymium, samarium and mixtures thereof with each other and the other rare earths; and other ions, for example, hydrogen and ammonium which behave in zeolite ZK-20 as metals in that they can replace metal ions without causing any appreciable change in the basic structure of the zeolite crystal. The transistion metals are those whose atomic numbers are from 21 to 28, from 39 to 46, and from 72 and 78 inclusive, namely scandium, titanium, vanadium, chromium, manganese, iron, cobalt, nickel, yttrium, zirconium, niobium, molybdenum, ruthenium, rhodium, palladium, hafnium, tantalum, tungsten, rhenium, osmium, iridium, and platinum.

Ion exchange of the sodium form of zeolite ZK-20 may be accomplished by conventional methods. A preferred, continuous method is to pack zeolite ZK-20 into a series of vertical columns and successively pass through the beds a water solution of a soluble salt of the cation to be introduced into the zeolite; and change the flow from the first bed to the second bed as the zeolite in the first bed becomes ion exchanged to the desired extent. The spatial arrangement of the aluminum, silicon and oxygen atoms which make up the basic crystal lattice of the zeolite remains essentially unchanged by partial or complete substitution of the sodium ion by other cations.

The following examples will serve to illustrate the present invention without limiting the same:

Example 1

1-methyl-1-azonia-4-azabicyclo [2.2.2] octane iodide was prepared using the method described by Miller in U.S. Patent 3,150,138, whose disclosure is hereby incorporated herein by reference. This iodide was converted to the hydroxide by treatment with moist silver oxide. The resulting solution was concentrated to 2.62 M by evaporation under vacuum.

Silica gel (9.12 g., 0.153 mole) was dissolved in 55.6 ml. (0.146 mole) of the quaternary hydroxide solution). This solution was added with stirring to a solution of 3.45 g. (0.0210 mole $Na_2O$ and 0.0147 mole $Al_2O_3$) of sodium aluminate. The mixture was heated at 80 to 100° C. for five days. The solid product was collected on a Büchner funnel and washed with water. Elemental analyses disclosed the following composition of the zeolitic product:

|  | Wt. percent |
|---|---|
| $Na_2O$ | [1] 12.7 |
| $Al_2O_3$ | [1] 25.0 |
| $SiO_2$ | [1] 62.2 |
| N | 2.29 |
| Ash | 76.7 |

|  | Mole or atom ratio |
|---|---|
| N/Al | 0.435 |
| Na/Al | .838 |
| $SiO_2/Al_2O_3$ | 4.23 |

[1] Results reported on ignited basis.

X-ray diffraction powder photographs indicated this material to be isostructural with levynite.

Example 2

Silver silicate, $Ag_2SiO_3$, was prepared from aqueous solutions of silver nitrate and sodium metasilicate. Excess silver nitrate was used. The solid product was collected on a filter and washed free of silver ion with water. An excess of the solid, insolule silver silicate was slurried with the quaternary ammonium iodide, the latter being prepared as descried in Example 1. The mixture was filtered and the solid residue of silver iodide and unreacted silver silicate was washed with water. The filtrate and washings were concentrated by evaporation under vacuum to 1.28 M. Analysis of the silicate solution disclosed a $N/SiO_2$ molar ratio of 4.0, the expected value for the compound whose structural representation appears herebelow:

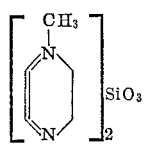

The silicate solution (121 ml., 0.155 mole $SiO_2$, 0.310 mole cation) was added to a solution of sodium aluminate which was identical with that described in Example 1. The mixture stood at 80–100° C. for five days and then was filtered and the zeolitic product was washed with water. The product, shown by X-ray diffraction to be levynite, had the composition:

|  | Wt. percent |
|---|---|
| $Na_2O$ | [1] 13.8 |
| $Al_2O_3$ | [1] 26.4 |
| $SiO_2$ | [1] 60.2 |
| N | 2.10 |
| Ash | 73.4 |

|  | Mole or atom ratio |
|---|---|
| N/Al | 0.395 |
| Na/Al | .863 |
| $SiO_2/Al_2O_3$ | 3.88 |

[1] Results reported on ignited basis.

Example 3

A solution of the quaternary silicate was prepared as described in Example 2. To this solution was added sufficient silica gel to yield a solute whose composition may be represented as

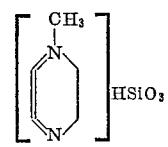

based on analyses of the solution.

The silicate solution (58.7 ml., 2.51 M, 0.1475 mole each $SiO_2$ and quaternary ammonium ion) was added to the same quantity of sodium aluminate solution as described above and heated to 80 to 100° C. for five days. The product, treated as described above, had the composition:

|  | Wt. percent |
|---|---|
| $Na_2O$ | [1] 8.7 |
| $Al_2O_3$ | [1] 21.9 |
| $SiO_2$ | [1] 69.0 |
| N | 2.70 |
| Ash | 68.4 |

|  | Mole or atom ratio |
|---|---|
| N/Al | 0.656 |
| Na/Al | 0.656 |
| $SiO_2/Al_2O_3$ | 5.35 |

[1] Results reported on ignited basis.

X-ray diffraction indicated the product to be levynite.

From the foregoing three examples, it can be seen that, although the cation in the zeolite formed possesses two basic nitrogens per ion, only one of these nitrogens (presumably the quaternary nitrogen) is sufficiently basic to serve as a cation in the zeolitic sense. This is apparent if the N/Al atom ratio is divided by two and added to the Na/Al atom ratio:

| Example | Na/Al | N/Al | N/2Al | Na/Al+ N/2Al | $SiO_2/Al_2O_3$ |
|---|---|---|---|---|---|
| 1 | 0.838 | 0.435 | 0.217 | 1.055 | 4.23 |
| 2 | 0.863 | 0.395 | 0.197 | 1.060 | 3.88 |
| 3 | 0.656 | 0.656 | 0.328 | 0.984 | 5.35 |

Thus, the number of cations calculated in this way agrees closely with the number of anionic sites which, theoretically, is reflected by the aluminum content.

It may also be seen from the foregoing examples that with an increase in the number of cation sites occupied by the quaternary ammonium ions, which ions are relatively large in size in comparison to those of sodium, the $SiO_2/Al_2O_3$ ratio increases. Thus the present invention, which discloses novel compositions of matter in the form of new synthetic zeolites and their novel methods of preparation, also discloses the means by which a zeolite having a high silica to alumina ratio, particularly a high silica to alumina levynite, may be prepared.

While the invention has been defined with particularity by the foregoing description, it is manifest that the invention may be embodied as well in other specific forms without departing from either its spirit or essential characteristics. It is therefore to be understood that the above description is merely illustrative of preferred embodiments of the invention and not in any way restrictive of the scope thereof as defined by the appended claims and all changes which come within their meaning and range of equivalency.

What is claimed is:

1. A crystalline synthetic material having the composition: 0.1 to 0.2 $R_{2/n}O$:0.8 to 0.9 $Na_2O$:1.0 $Al_2O_3$:4 to 5

$$SiO_2 \cdot YH_2O$$

where R is selected from the group consisting of a nitrogen-containing cation derived from 1-methyl-1-azonia-4-azabicyclo [2.2.2] octane ion and mixtures of said cation with hydrogen and $n$ is the valence thereof and Y is any value from about 1 to about 5.

2. A crystalline synthetic material having the composition: 0.1 to 0.2 $T_{2/n}O$:0.8 to 0.9 $Na_2O$:1.00$Al_2O_3$:4 to 5 $SiO_2 \cdot YH_2O$ where T is a nitrogen-containing cation derived from 1-methyl-1-azonia - 4 - azabicyclo [2.2.2] octane ion and $n$ is the valence thereof; and Y is any value from about 1 to about 5.

3. A method for synthesizing a solid, porous crystalline aluminosilicate having uniform pores, the atoms in said aluminosilicate being arranged in a unit cell in such a manner that the significant lines of the X-ray diffraction pattern of said aluminosilicate are substantially as shown in Table I, comprising preparing a reaction mixture whose composition, expressed in terms of approximate mole ratios of oxides, falls within the following ranges:

$$SiO_2/Al_2O_3$$

of from about 4 to about 11

$$\frac{Na_2O}{Na_2O + [CH_3(CH_2)_6N_2]_2O}$$

of from about 0.05 to about 0.15

$$\frac{H_2O}{Na_2O + [CH_3(CH_2)_6N_2]_2O}$$

of from about 20 to about 50

$$\frac{Na_2O + [CH_3(CH_2)_6N_2]_2O}{SiO_2}$$

of from about 0.5 to about 1.5 and maintaining said mixture at a temperature within the range of about 80 to about 120° C. until said crystalline aluminosilicate is formed.

4. A method for synthesizing a solid, porous crystalline aluminosilicate according to claim 3, wherein the formed crystals of said aluminosilicate are separated from the mother liquor, and the thus-separated crystals are subjected to an activation treatment by heating at a temperature in the approximate range of from about 300 to about 600° C.

5. A method for synthesizing a crystalline aluminosilicate zeolite which comprises admixing a siliceous gel and 1-methyl-1-azonia - 4 - azabicyclo[2.2.2]octane hydroxide, bringing the thus-formed mixture into contact with sodium aluminate to form a resulting reaction mixture whose composition, expressed in terms of oxide mole ratios, falls within the following ranges:

$$SiO_2/Al_2O_3$$

of from about 4 to about 11

$$\frac{Na_2O}{Na_2O + [CH_3(CH_2CH_2)_3N_2]^2O}$$

of from about 0.05 to about 0.15

$$\frac{H_2O}{Na_2O + [CH_3(CH_2CH_2)_3N_2]_2O}$$

of from about 20 to about 50

$$\frac{Na_2O + [CH_3(CH_2CH_2)_3N_2]_2O}{SiO_2}$$

of from about 0.5 to about 1.5 and maintaining said mixture at a temperature within the approximate range of from about 80 to about 120° C. until said crystalline zeolite is formed.

6. A method for synthesizing a solid, porous crystalline aluminosilicate according to claim 5, wherein the formed crystals of said aluminosilicate are separated from the mother liquor, and the thus-separated crystals are subjected to an activation treatment by heating at a temperature in the approximate range of from about 300 to about 600° C.

7. A method for synthesizing a crystalline aluminosilicate zeolite which comprises reacting sodium aluminate with 1-methyl-1-anzonia - 4 - azabicyclo[2.2.2]octane silicate, the resulting reaction mixture having a composition expressed in terms of oxide mole ratios within the following ranges:

$$SiO_2/Al_2O_3$$

of from about 4 to about 11

$$\frac{Na_2O}{Na_2O + [CH_3(CH_2CH_2)_3N_2]_2O}$$

of from about 0.05 to about 0.15

$$\frac{H_2O}{Na_2O + [CH_3(CH_2CH_2)_3N_2]_2O}$$

of from about 20 to about 50

$$\frac{Na_2O + [CH_3(CH_2CH_3)_3N_2]_2O}{SiO_2}$$

of from about 0.5 to about 1.5 and maintaining said mixture at a temperature within the approximate range of from about 80 to about 120° C. until said crystalline zeolite is formed.

8. A method for synthesizing a solid, porous crystalline aluminosilicate according to claim 7, wherein the formed crystals of said aluminosilicate are separated from the mother liquor, and the thus-separated crystals are subjected to an activation treatment by heating at a temperature in the approximate range of from about 300 to about 600° C.

9. The composition of claim 1 admixed with a clay bonding agent.

10. The composition of claim 1 contained in an inorganic oxide gel matrix.

11. The composition of claim 1 wherein at least a portion of the sodium is replaced with ions selected from the group consisting of hydrogen and ammonium.

References Cited

UNITED STATES PATENTS

| | | | |
|---|---|---|---|
| 2,973,327 | 2/1961 | Mitchell et al. | 252—455 X |
| 3,150,138 | 9/1964 | Miller | 260—268 |
| 3,247,195 | 4/1966 | Kerr | 252—430 X |
| 3,293,192 | 12/1966 | Maher et al. | 252—430 |
| 3,374,057 | 3/1968 | McDaniel et al. | 23—112 |

DANIEL E. WYMAN, Primary Examiner

C. F. DEES, Assistant Examiner

U.S. Cl. X.R.

23—113; 252—435, 455; 260—242

PO-1050
(5/69)

UNITED STATES PATENT OFFICE
CERTIFICATE OF CORRECTION

Patent No. 3,459,676                    Dated  August 5, 1969

Inventor(s)  George T. Kerr

It is certified that error appears in the above-identified patent and that said Letters Patent are hereby corrected as shown below:

Column 2, line 6, "U.S. 3,008,903" should be
--U.S. 3,008,803--. Column 8, line 32, that portion
of the formula reading "($CH_2CH_3$)" should read
--($CH_2CH_2$)--

SIGNED AND
SEALED
MAR 31 1970

(SEAL)
Attest:

Edward M. Fletcher, Jr.
Attesting Officer

WILLIAM E. SCHUYLER, JR.
Commissioner of Patents